(12) United States Patent
Pattanaik et al.

(10) Patent No.: US 12,355,542 B2
(45) Date of Patent: Jul. 8, 2025

(54) MULTIPLE RECEIVER COMBINING FOR WIRELESS COMMUNICATIONS

(71) Applicant: Apple Inc., Cupertino, CA (US)

(72) Inventors: Nishant Pattanaik, San Diego, CA (US); Jay P Shah, Newark, CA (US); Lohit Sarna, San Mateo, CA (US); Mehran T Baghaei, San Diego, CA (US); Venkateswara Rao Manepalli, San Jose, CA (US); Sudeep Bhattarai, Hayward, CA (US); Seshu Tummala, Cupertino, CA (US); Sudhir K Baghel, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 17/870,534

(22) Filed: Jul. 21, 2022

(65) Prior Publication Data

US 2024/0030998 A1 Jan. 25, 2024

(51) Int. Cl.
*H04B 7/08* (2006.01)
*H04L 25/02* (2006.01)
*H04W 56/00* (2009.01)

(52) U.S. Cl.
CPC .......... *H04B 7/086* (2013.01); *H04B 7/0842* (2013.01); *H04B 7/0894* (2013.01); *H04L 25/0204* (2013.01); *H04W 56/006* (2013.01)

(58) Field of Classification Search
CPC ........ H04B 7/086; H04B 7/01; H04B 7/0894; H04B 7/0842; H04W 56/006
See application file for complete search history.

(56) References Cited

U.S. PATENT DOCUMENTS

| | | |
|---|---|---|
| 5,619,524 A | 4/1997 | Ling et al. |
| 6,760,599 B1 | 7/2004 | Uhlik |
| 7,269,205 B2 | 9/2007 | Wang |
| 7,847,730 B2 | 12/2010 | Ryba |
| 8,165,249 B2 | 4/2012 | Li et al. |
| 8,209,596 B1 | 6/2012 | Gilmour et al. |

(Continued)

FOREIGN PATENT DOCUMENTS

| | | |
|---|---|---|
| CN | 113612715 A | 11/2021 |
| WO | 2021217895 A1 | 11/2021 |

OTHER PUBLICATIONS

Extended European Search Report for European Patent Application No. 23182100.0 dated Dec. 18, 2023; 10 pgs.

(Continued)

*Primary Examiner* — Redentor Pasia
(74) *Attorney, Agent, or Firm* — FLETCHER YODER PC

(57) ABSTRACT

User equipment includes a receiver, a first antenna and a second antenna coupled to the receiver, and processing circuitry communicatively coupled to the receiver and configured to cause the receiver to receive a first signal via the first antenna and a second signal via the second antenna, adjust the first signal based on a first time offset and a first frequency offset associated with the first signal to generate a first adjusted signal, adjust the second signal based on a second time offset and a second frequency offset associated with the second signal to generate a second adjusted signal, and decode downlink information based on the first adjusted signal and the second adjusted signal.

20 Claims, 12 Drawing Sheets

(56) References Cited

U.S. PATENT DOCUMENTS

| | | | |
|---|---|---|---|
| 8,699,612 B1* | 4/2014 | Chiu | H04L 25/0204 |
| | | | 375/267 |
| 10,411,782 B2 | 9/2019 | Namgoong et al. | |
| 10,833,907 B2* | 11/2020 | Ellenbeck | H04L 27/36 |
| 11,218,279 B2 | 1/2022 | Kwak et al. | |
| 11,444,670 B1* | 9/2022 | Kleider | H04B 7/024 |
| 11,546,870 B2* | 1/2023 | Guo | H04W 74/006 |
| 11,671,156 B1* | 6/2023 | Kleider | H04B 7/0617 |
| | | | 375/267 |
| 2012/0195256 A1* | 8/2012 | Khoury | H04W 56/0035 |
| | | | 370/328 |
| 2016/0286503 A1* | 9/2016 | Bengtsson | H04W 52/248 |
| 2017/0242092 A1* | 8/2017 | Marquez | G01S 3/46 |
| 2018/0213385 A1* | 7/2018 | Aminaka | H04W 8/005 |
| 2018/0341000 A1* | 11/2018 | Cohen | G01S 13/87 |
| 2019/0075598 A1* | 3/2019 | Li | H04W 74/0833 |
| 2020/0252115 A1* | 8/2020 | Paramesh | H04B 1/18 |
| 2020/0305202 A1* | 9/2020 | Zhang | H04W 74/0833 |
| 2020/0333431 A1* | 10/2020 | Völkel | G01S 13/426 |
| 2020/0351058 A1* | 11/2020 | Zhu | H04L 1/0041 |
| 2021/0211254 A1 | 7/2021 | Park et al. | |
| 2021/0273719 A1 | 9/2021 | Wang et al. | |
| 2021/0321341 A1* | 10/2021 | Ryu | H04W 56/001 |
| 2022/0006493 A1* | 1/2022 | Wang | H04B 7/024 |
| 2022/0022192 A1* | 1/2022 | Sakhnini | H04L 5/0023 |
| 2022/0104233 A1* | 3/2022 | Jeon | H04L 5/0051 |
| 2022/0338183 A1* | 10/2022 | Zheng | H04L 1/0025 |
| 2023/0073645 A1* | 3/2023 | Dimou | H04L 1/1845 |
| 2023/0088488 A1* | 3/2023 | Venugopal | H04W 72/044 |
| | | | 370/329 |
| 2023/0119526 A1* | 4/2023 | Wang | H04W 76/11 |
| | | | 370/328 |
| 2023/0308172 A1* | 9/2023 | Lin | H04B 7/18519 |
| 2024/0014934 A1* | 1/2024 | Wang | H04L 5/0016 |

OTHER PUBLICATIONS

Intel Corporation; "Enhancements to HST-SFN Deployments"; Discussion & Decision; Agenda Item 8.1.2.4 (e- Meeting); Oct. 26, 2020-Nov. 13, 2020.

Price R et al: "A Communication Technique for Multipath Channels", Proceedings of the IRE, IEEE, Piscataway, NJ, US, vol. 46, No. 3, Mar. 1, 1958 (Mar, 1, 1958 ), pp. 555-570, XP011156300, ISSN: 0096-8390, DOI: 10.1109/JRPROC.1958.286870.

Article 94(3) Communication from EP Application No. 23182100.0 dated Dec. 3, 2024; 6 pgs.

* cited by examiner

MULTIPLE RECEIVER COMBINING FOR WIRELESS COMMUNICATIONS

BACKGROUND

The present disclosure relates generally to wireless communication, and more specifically to combining signals received at multiple antennas of user equipment.

User equipment (e.g., a mobile communication device) may transmit and receive wireless signals (e.g., carrying user data) with a communication node (e.g., a non-terrestrial station, a satellite, and/or a high-altitude platform station). For instance, the communication node may transmit a downlink signal (e.g., by relaying the hub signal) to the user equipment via a downlink beam. The user equipment may receive the downlink signal via a receiver coupled to an antenna. However, using a single antenna to receive the downlink signal may have issues when the downlink signal is weak. For example, a change in coverage of the downlink beam or an obstruction blocking the antenna may weaken the downlink signal received by the antenna. As a result, the user equipment may not be able to process (e.g., decode) the received downlink signal to obtain useful or meaningful data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment includes a first antenna and a second antenna, a receiver each coupled to the first antenna and the second antenna, and processing circuitry coupled to the receiver and configured to cause the receiver to receive a first signal via the first antenna and a second signal via the second antenna, adjust the first signal based on a first time offset and a first frequency offset associated with the first signal to generate a first adjusted signal, adjust the second signal based on a second time offset and a second frequency offset associated with the second signal to generate a second adjusted signal, and decode downlink information based on the first adjusted signal and the second adjusted signal.

In another embodiment, a method includes receiving a first signal via a receiver coupled to a first antenna of an electronic device, receiving a second signal via the receiver coupled to a second antenna of the electronic device, adjusting, via processing circuitry of the electronic device, the first signal based on a first time offset, a first frequency offset, and a first weighting factor associated with the first signal to generate a first adjusted signal, adjusting, via processing circuitry of the electronic device, the second signal based on a second time offset, a second frequency offset, and a second weighting factor associated with the second signal to generate a second adjusted signal, and decoding, via processing circuitry of the electronic device, downlink information based on the first adjusted signal and the second adjusted signal.

In yet another embodiment, a non-transitory, computer-readable medium includes instructions that, when executed by processing circuitry, cause the processing circuitry to receive a first signal via a first antenna of an electronic device, receive a second signal via a second antenna of the electronic device, adjust the first signal based on a first time offset and a first frequency offset associated with the first signal to generate a first adjusted signal, adjust the second signal based on a second time offset and the second frequency offset associated with the second signal samples to generate a second adjusted signal, combine the first adjusted signal and the second adjusted signal to generate a combined signal, and decode downlink information based on the combined signal.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
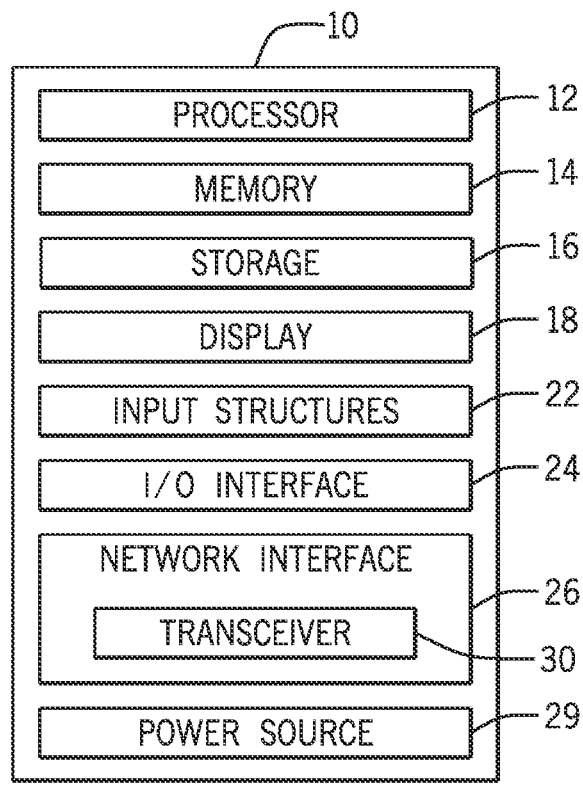
FIG. 1 is a block diagram of user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to facilitating communication between a mobile communication device (e.g., user equipment) and a communication hub (e.g., a gateway, a base station, or a network control center) using multiple beams from a communication node (e.g., non-terrestrial station, satellite, or high-altitude platform stations). The user equipment may include a cell phone, a personal digital assistance device, or any other suitable device used to receive or transmit signals. The signals may include or be associated with various forms of communication emergency text messaging, emergency voice calling, acknowledgement messaging, video streaming, internet browsing, and so forth. In particular, the communication node may facilitate signal transmissions between the user equipment and the communication hub. For example, the user equipment may use the communication nodes for bidirectional communication by relaying the signal transmissions from the user equipment to the communication hub via the communication node, and vice versa.

The communication node may emit multiple forward beams (e.g., beams that transmit downlink signals to the user equipment) and multiple reverse beams (e.g., beams that receive uplink signals from the user equipment). A downlink signal may include multiple signal samples, each having a preamble, a broadcast interval (BI), a broadcast (BCAST) section, a unicast (UCAST) section, and so on. In some cases, the user equipment may use an antenna (denoted as a first antenna) to receive a downlink signal from the communication node and/or transmit an uplink signal to the communication node. When a downlink signal is transmitted to the user equipment, the first antenna receives signal samples each having a time offset and a frequency offset. A detected signal power of the downlink signal may include pilot power corresponding to the preamble and the broadcast interval, and payload power corresponding to the subsequent sections (e.g., the broadcast and unicast sections). A processing circuitry of the user equipment may adjust each signal sample of the downlink signal based on the time offset and the frequency offset and align the signal sample in both time and frequency domains. The processing circuitry may perform further signal processing operations based on the aligned signal samples. Such signal processing operations may include decoding the broadcast interval, determining the number of receiver unicast burst, and so on.

However, in some cases, the downlink signals received by the antenna of the user equipment may become problematic (e.g., weakened, noisy). For example, coverage of beams (e.g., forward beams) of the communication node may change over the time (e.g., due to movement of the communication node). Additionally, a user may interfere with the antenna of the user equipment (e.g., the user's hand may block the antenna when gripping the user equipment) or the user equipment location may change from a clear space with a good connection to the satellite to an obstructed geographical location (e.g., foliage-covered location) causing poor connection. Such factors (e.g., location change of the communication node and/or the user equipment, hand grip positioning, foliage condition, and so on) may degrade the quality or strength of the downlink signals. As a result, the user equipment may not continuously connect with the communication node and decode the downlink signals properly or accurately.

To enable the user equipment to track a beam (e.g., a forward beam) of the communication node and decode the broadcast interval, the unicast, and/or data (e.g., for an increased or maximum amount of time in varying terrain and/or hand grip positions) of a downlink signal, a second antenna of the user equipment may also receive the signal from the communication node, in addition to the first antenna. The first and second antennas may receive the downlink signals (e.g., which may be sent as a single signal from the communication node) independently with different time and frequency offsets. For each antenna, the processing circuitry may adjust the received downlink signals (e.g., signal samples) for the time and frequency offsets. After aligning the received signals in both time and frequency domains for each antenna, the processing circuitry may combine the downlink signals from the first and second antennas (e.g., by weighting the signals based on detected pilot power by each antenna, estimating signal-to-noise ratio (SNR) of each signal, and so on). This technique of combining received signals at multiple antennas of the user equipment may enable better downlink performance (e.g., improved signal strength and/or signal-to-noise ratio) for an extended duration of time (e.g., including during emergency situations) when compared to using a single antenna for detecting the downlink signals.

Embodiments herein provide various apparatuses and techniques to combine downlink signals received by multiple antennas to exclude various noise and/or interference mixed with the downlink signals and extract (e.g., by signal decoding and processing) useful data from the downlink signals. The downlink signals from each antenna may be processed independently by processing circuitry (e.g., circuitry equipped with various signal processing hardware, software, and algorithms, such as fast Fourier transform (FFT), signal-to-noise ratio (SNR) estimation, filtering, de-noise, and so on). For instance, the processing circuitry may perform signal analysis on the received signals in both time and frequency (e.g., using fast Fourier transform) to determine time and frequency shifts (e.g. offsets with respect to time and frequency axis, respectively). The processing circuitry may adjust the received signals based on the determined time and frequency shifts to align the received signals in both time and frequency domains. Using aligned signals, the processing circuitry may perform a signal/noise analysis to estimate a signal-to-noise ratio. Based on the estimated signal-to-noise ratio, the processing circuitry may determine the pilot power associated with the downlink signals. A weighting factor (e.g., based on the pilot power) is applied to the aligned signals. After weighting, the processing circuitry may combine the weighted signals for further processing. The combined signals may have improved signal qualities (e.g., higher signal-to-noise ratio) when compared to the downlink signals detected by a single antenna (e.g., the first or the second antenna). Using the combined signals, the processing circuitry may be able to decode the downlink signals with improved reliability and accuracy that may not be achieved by using a single antenna.

FIG. 1 is a block diagram of user equipment 10 (e.g., an electronic device or a mobile communication device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, the memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein. The processors 12 may perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. For instance, the instructions or routines may include various signal processing components or algorithms, such as fast Fourier transform (FFT), signal-to-noise ratio (SNR) estimation, filtering, de-noise, and so on. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable the user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol.

The network interface 26 may include, for example, one or more interfaces for a peer-to-peer connection, a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, New Radio (NR) cellular network, $6^{th}$ generation (6G) cellular network and beyond, a satellite connection (e.g., via a satellite network), and so on. In particular, the network interface 26 may include, for example, one or more interfaces for using a Release-15 cellular communication standard of the 5G specifications that include the millimeter wave (MM Wave) frequency range (e.g., 24.25-300 gigahertz (GHz)). The network interface 26 of the user equipment 10 may allow communication over the aforementioned networks (e.g., 5G, Wi-Fi, LTE-LAA, and so forth). The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, UWB network, alternating current (AC) power lines, and so forth. The network interface 26 may, for instance, include a transceiver 30 for communicating signals using one of the aforementioned networks. The power source 29 of the user equipment 10 may include any suitable source of power, such as a rechargeable lithium polymer (Li-poly) battery and/or an alternating current (AC) power converter.

Figure 2:
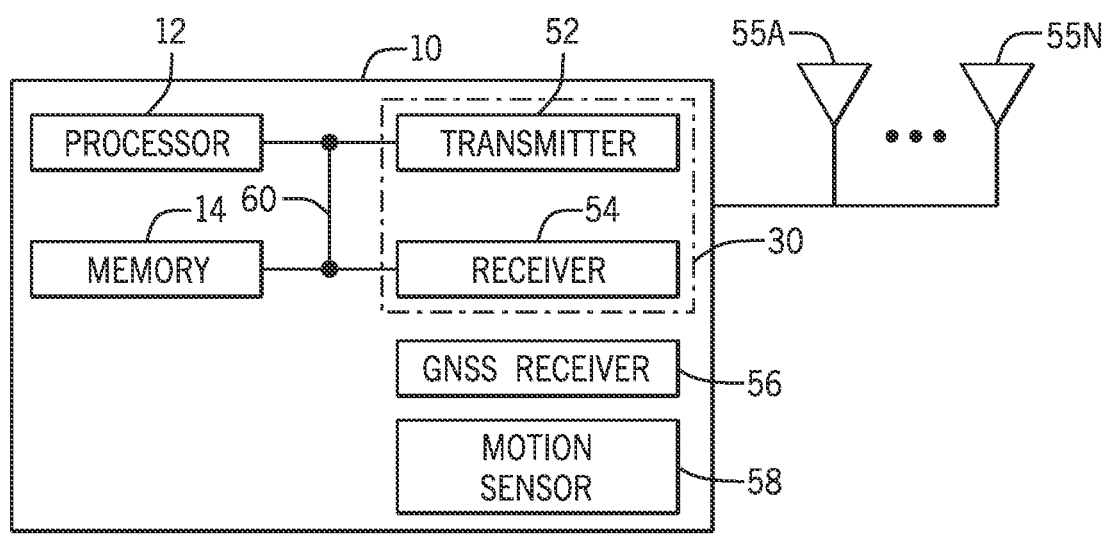
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55), and/or a global navigation satellite system (GNSS) receiver 56 may be communicatively coupled directly or indirectly (e.g., through or via another component, a communication bus, a network) to one another to transmit and/or receive signals between one another.

The user equipment 10 may include the transmitter 52 and/or the receiver 54 that respectively transmit and receive signals between the user equipment 10 and an external device via, for example, a network (e.g., including base stations) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. For example, the user equipment 10 may include a first transceiver to send and receive messages using a first wireless communication network, a second transceiver to send and receive messages using a second wireless communication network, and a third transceiver to send and receive messages using a third wireless communication network, though any or all of these transceivers may be combined in a single transceiver. In some embodiments, the transmitter 52 and the receiver 54 may transmit and receive information via other wired or wireline systems or means.

The user equipment 10 may include the GNSS receiver 56 that may enable the user equipment 10 to receive GNSS signals from a GNSS network that includes one or more GNSS satellites or GNSS ground stations. The GNSS signals may include a GNSS satellite's observation data, broadcast orbit information of tracked GNSS satellites, and supporting data, such as meteorological parameters, collected from co-located instruments of a GNSS satellite. For example, the GNSS signals may be received from a Global Positions System (GPS) network, a Global Navigation Satellite System (GLONASS) network, a BeiDou Navigation Satellite System (BDS), a Galileo navigation satellite network, a Quasi-Zenith Satellite System (QZSS or Michibiki) and so on. The GNSS receiver 56 may process the GNSS signals to determine a global position of the user equipment 10.

The user equipment 10 may include one or more motion sensors 58 (e.g., as part of the input structures 22). The one or more motion sensors (collectively referred to as "a motion sensor 58" herein) may include an accelerometer, gyroscope, gyrometer, and the like, that detect and/or facilitate determining a current location of the user equipment, an orientation (e.g., including pitch, yaw, roll, and so on) and/or motion of the user equipment 10, a relative positioning (e.g., an elevation angle) between the user equipment 10 and a communication node.

As illustrated, the various components of the user equipment 10 may be coupled together by a bus system 60. The bus system 60 may include a data bus, for example, as well as a power bus, a control signal bus, and a status signal bus, in addition to the data bus. The components of the user equipment 10 may be coupled together or accept or provide inputs to each other using some other mechanism.

Figure 3:
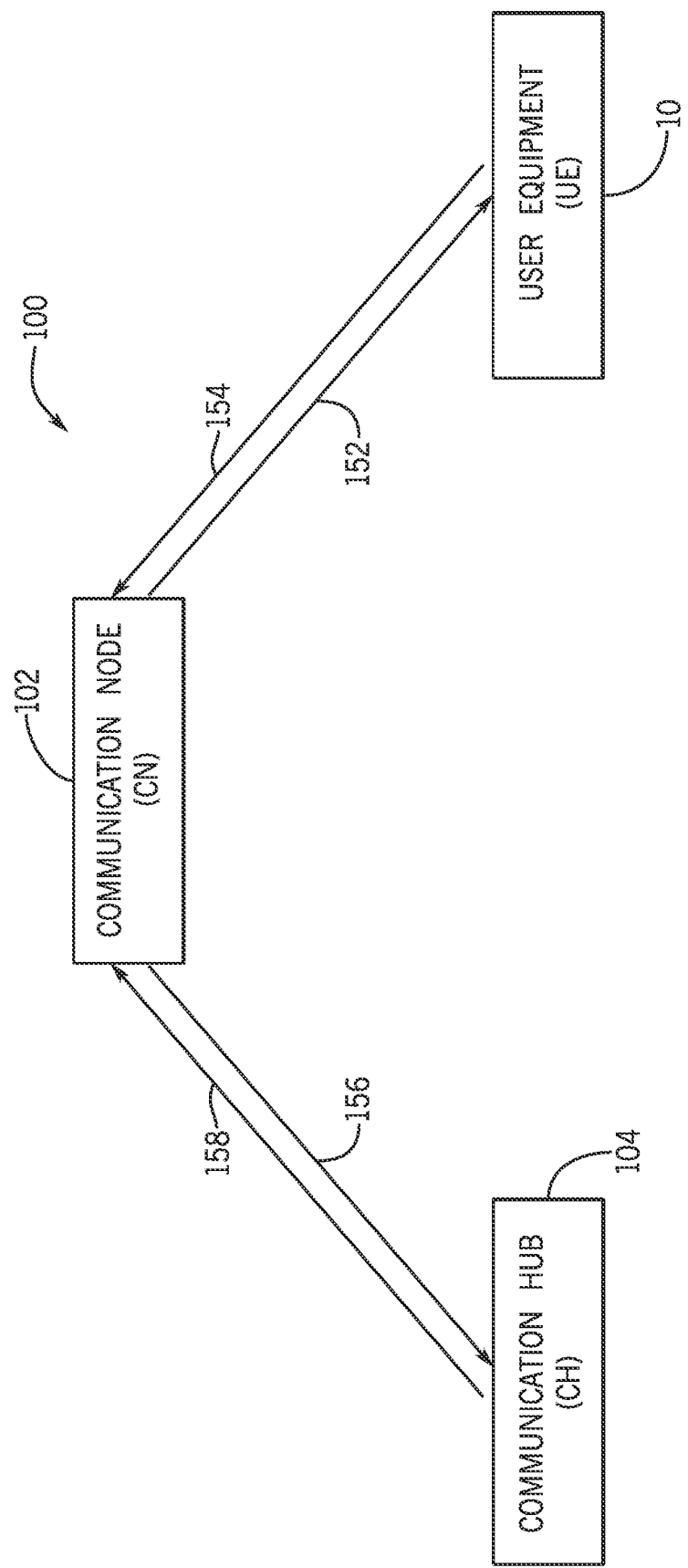
FIG. 3 is a schematic diagram of a communication system using a communication node for signal transmissions with the user equipment of FIG. 1, according to embodiments of the present disclosure.

With the foregoing in mind, FIG. 3 is a schematic diagram of a communication system 100 using a communication node 102 for signal transmissions with the user equipment 10 of FIG. 1, according to embodiments of the present disclosure. The communication system 100 includes a communication node 102, which may include base stations, such as Next Generation NodeB (gNodeB or gNB) base stations that provide 5G/NR coverage to the user equipment 10, Evolved NodeB (eNodeB) base stations and may provide 4G/LTE coverage to the user equipment 10, and so on. Additionally or alternatively, the communication node 102 may include non-terrestrial base stations, high altitude platform stations, airborne base stations, spaceborne base stations, satellites (e.g., a low earth orbit satellite, a medium earth orbit satellite, a geosynchronous equatorial orbit satellite, a high earth orbit satellite), or any other suitable nonstationary communication devices, communicatively coupled to the user equipment 10. The communication node 102 may be communicatively coupled to a communication hub 104, such as another electronic device, a terrestrial base station, a ground station, a call center, and so forth, to enable communication of signals between the communication hub 104 and the user equipment 10. For example, the user equipment 10, using its transceiver 30 communicatively coupled to the antenna 55, may transmit a signal (e.g., an uplink signal) to the communication node 102, and the communication node 102 may forward the signal to the communication hub 104. Additionally or alternatively, the communication hub 104 may transmit a signal to the communication node 102, and the communication node 102 may forward the signal (e.g., a downlink signal) to the user equipment 10 for receipt, using its transceiver 30. In some embodiments, the transceiver 30 may include a software-defined radio that enables communication with the communication node 102. For example, the transceiver 30 may be capable of communicating via a first communication network (e.g., a cellular network), and may be capable of communicating via a second communication network (e.g., a non-terrestrial network) when operated by software (e.g., stored in the memory 14 and/or the storage 16 and executed by the processor 12).

At each communication cycle, the user equipment 10 may synchronize to the communication node 102 to establish a connection for bidirectional communication. For example, the user equipment 10 may transmit an uplink signal to the communication node 102 via a beam 152 (e.g., a reverse beam that receives the uplink signal) and/or receive a downlink signal from the communication node 102 via a beam 154 (e.g., a forward beam that transmits the downlink signal to the user equipment 10). The communication node 102 may also synchronize to the communication hub 104 to establish a connection for bidirectional communication. For example, the communication node 102 may relay the uplink signal to the communication hub 104 via a beam 156 (e.g., a communication-node-to-communication-hub beam), and receive a communication hub signal (e.g., a signal in response to the uplink signal sent from the user equipment 10) from the communication hub 104 via a beam 158 (e.g., a communication-hub-to-communication-node beam).

Figure 4:
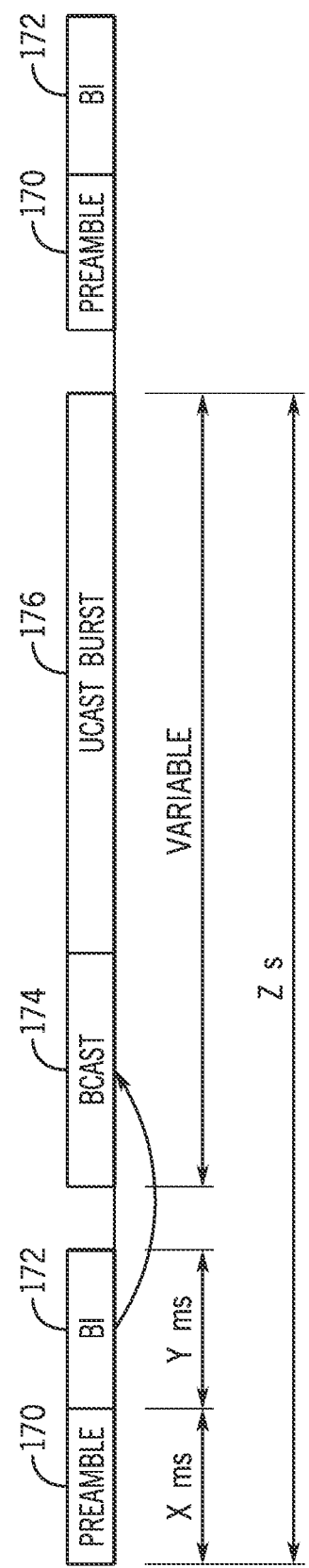
FIG. 4 is a schematic diagram of signal frame structure and cycle for signals received by the user equipment of FIG. 1, according to embodiments of the present disclosure.

FIG. 4 is a schematic diagram of signal frame structure and cycle for signals received by the user equipment 10 of FIG. 1, according to embodiments of the present disclosure. As mentioned above, the user equipment 10 may receive a downlink signal from a communication node (e.g., communication node 102) via a forward beam (e.g., beam 154). The downlink signal may include multiple signal samples each having a preamble 170, a broadcast interval (BI) 172, a broadcast (BCAST) section 174, and a unicast (UCAST) section 176. The preamble 170 may be referred to as a signal used in network communications to synchronize transmission timing between two or more systems and/or devices. The preamble 170 may be located at a beginning section of the downlink signal and have a time duration (e.g., X milliseconds (ms), which may include 5 seconds or less, 2 seconds or less 1 second or less, 500 ms or less, 100 ms or less, 50 ms or less, 10 ms or less, and so on). The broadcast interval 172 may follow the preamble 170 in the downlink signal and have a different time duration (e.g., Y ms, which may include 5 seconds or less, 2 seconds or less, 1 second or less, 500 ms or less, 100 ms or less, 50 ms or less, 10 ms or less, and so on). The broadcast interval 172 may include communication node information (e.g., position, orientation, and so on) that may be decoded by the user equipment 10. For example, the decoded broadcast interval 172 may include orientation information (e.g., yaw information) associated with the communication node 102. The broadcast (BCAST) section 174 and the unicast (UCAST) section 176 may include or be associated with payload or user data (e.g., data in various forms of communication emergency text messaging, emergency voice calling, acknowledgement messaging, video streaming, internet browsing, and so forth). The broadcast (BCAST) section 174 and the unicast (UCAST) section 176 may have a variable time duration (e.g., depending on the data content, which may include 5 seconds or less, 2 seconds or less, 1 second or less, 500 ms or less, 100 ms or less, 50 ms or less, 10 ms or less, and so on). Each subsequent signal sample may have a time interval (e.g., Z second (s), which may include 10 s or less, 5 s or less, 2 s or less, 1 s or less, and so on) with respect to a preceding signal sample (e.g., the time interval may be measured based on a time difference between the preamble 170 of the first and the second signal samples).

Figure 5:
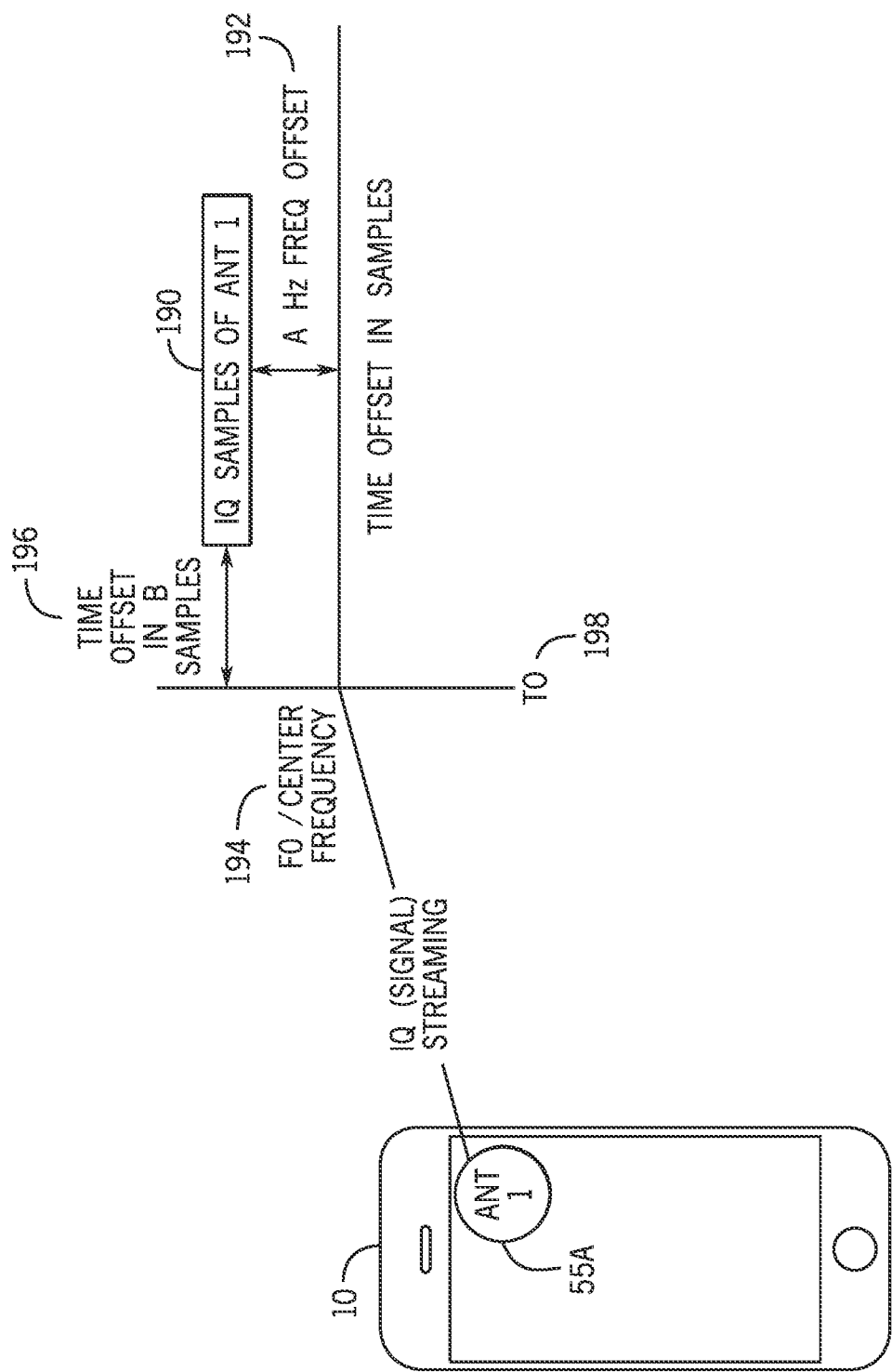
FIG. 5 is a schematic diagram of the user equipment of FIG. 1 using an antenna to receive a signal, according to embodiments of the present disclosure.

The user equipment 10 may receive a signal having the frame structure and cycle described in FIG. 4 from a communication node 102 at an antenna 55. FIG. 5 is a schematic diagram 100 of the user equipment 10 (e.g., a mobile phone) of FIG. 1 using an antenna 55A (Ant 1) to detect a signal, according to embodiments of the present disclosure. The detected signal may include streamed data such as IQ samples 190 (or in-phase and/or quadrature samples) received at the antenna 55A (Ant 1). In radio frequency (RF) applications, a pair of periodic signals may be referred to be in "quadrature" when they differ in phase (e.g., by 90 degrees). The "in-phase" or reference signal is referred to as 'I,' and the signal that is shifted by 90 degrees (the signal in quadrature) is referred to as 'Q.'

The processing circuitry 12 may analyze the IQ samples 190. The IQ samples 190 may be offset by frequency and time due to the movement of the communication node 102, the movement of the user equipment 10, or both. As such, the processing circuitry 12 may analyze the IQ samples 190 in a frequency domain (e.g., using Fourier transform or fast Fourier transform (FFT)) to determine a frequency offset 192 (e.g., in A Hertz (hz)) with respect to a central frequency (FO) 194. Additionally, the processing circuitry may analyze the IQ samples 190 in a time domain to determine a time offset 196 (e.g., in B samples) with respect to a starting time (TO) 198. Various conditions, such as movement of the communication node 10, varied beam coverage, user interference (e.g., a user's hand blocking the antenna 55A), or obstructed geographical location (e.g., foliage-covered location), may cause or contribute to the frequency offset 192 and the time offset 196. In some embodiments, the processing circuitry 12 may use a relative positioning between the communication node 102 and the user equipment 10 to determine the frequency offset 192 and the time offset 196. In one example, the relative positioning may include data from the ephemeris data, such as various operating parameters that may be associated with movement (e.g., orbital location, orientation) of the communication node 102, movement of the Earth (e.g., a gravitational property, an orbit of the Earth), a historical positioning of the communication node 102, and the like. In another example, the relative positioning may include data from GNSS signals (e.g., received by the GNSS receiver 56), such as observation data, broadcast orbit information, and supporting data associated with GNSS satellites to determine a location of the user equipment 10. In another example, the relative positioning may include data from orientation data received from the motion sensor 58 to determine an orientation of the user equipment 10.

Figure 6:
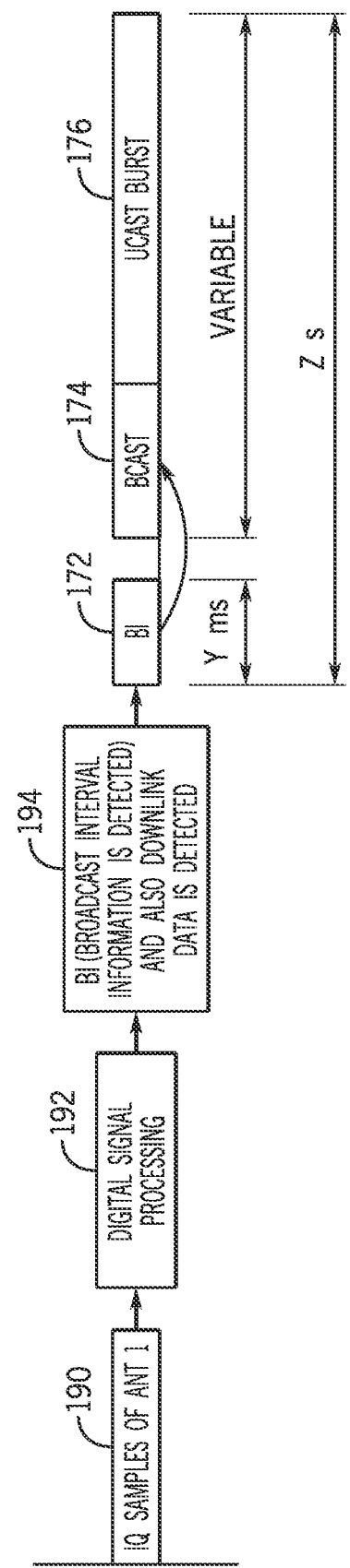
FIG. 6 is a block diagram of signal processing performed on the signal received by the antenna of FIG. 5, according to embodiments of the present disclosure.

FIG. 6 is a block diagram of signal processing performed on the signal received by the antenna 55A of FIG. 5, according to embodiments of the present disclosure. At a processing block 192, the processing circuitry 12 may perform digital signal processing on the IQ samples 190.

The digital signal processing may include signal analysis in both time and frequency domains. The processing circuitry 12 may then determine frequency and time offsets (e.g., the frequency offset 192 and the time offset 196) based on the signal analysis. Furthermore, the processing circuitry 12 may adjust the IQ samples 190 based on the determined frequency and time offsets to align the IQ samples 190 in both time and frequency domains.

After aligning the IQ samples 190, at a processing block 194, the processing circuitry 12 may decode the aligned IQ samples 190 to obtain data encoded in the broadcast interval 172 (e.g. orientation information associated with the communication node 102), data encoded in the broadcast (BCAST) section 174 and/or the unicast (UCAST) section 176 (e.g., payload or user data including emergency text messaging, emergency voice calling, acknowledgement messaging, video streaming, internet browsing, and so on).

Figure 7:
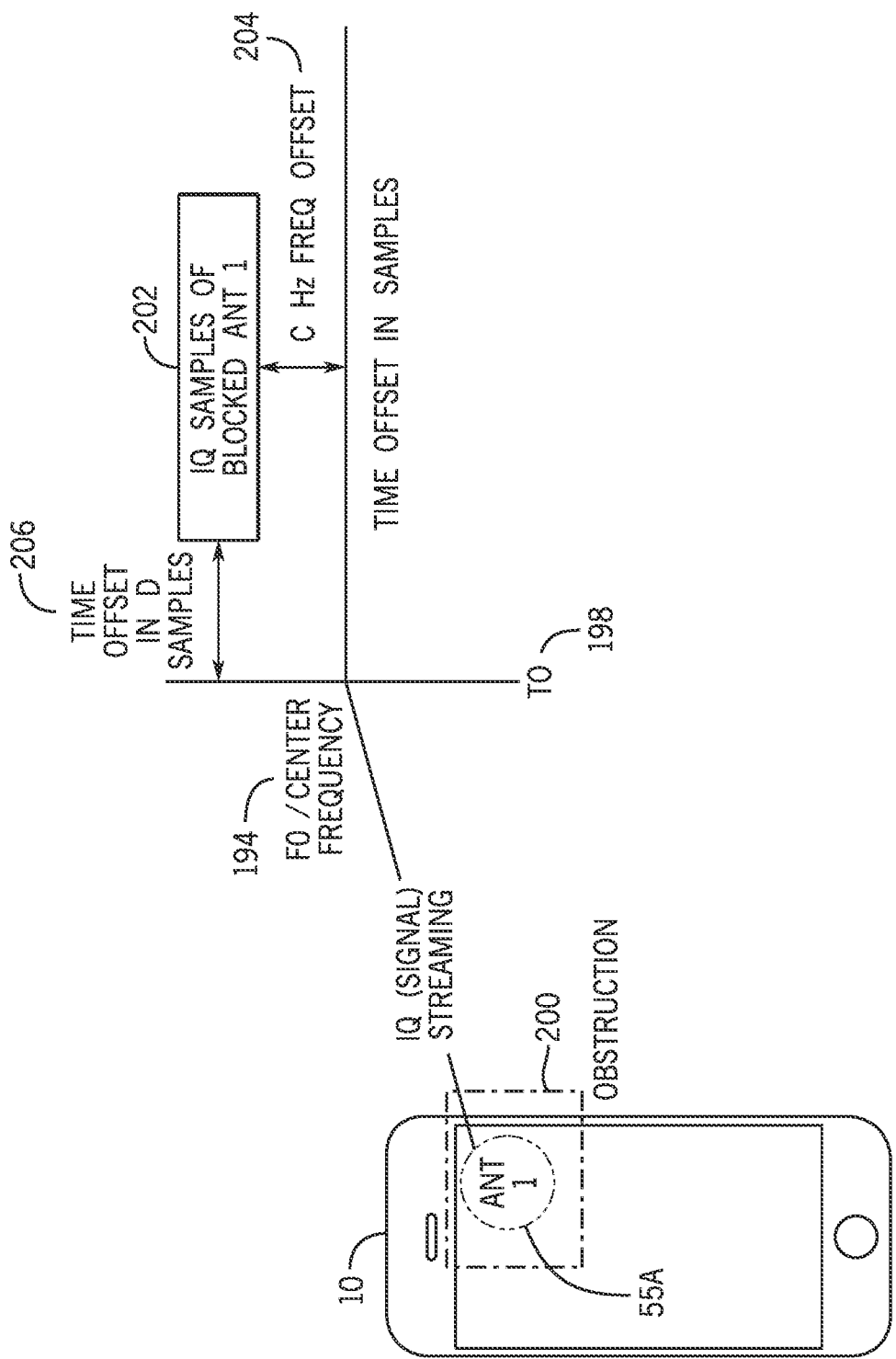
FIG. 7 is a schematic diagram of the user equipment of FIG. 1 using a blocked antenna to receive a signal, according to embodiments of the present disclosure.

In some cases, certain issues (e.g., an obstruction blocking an antenna of the user equipment 10) may cause the user equipment 10 to receive a downlink signal with degraded signal quality (e.g., weak signal power, low signal-to-noise ratio). As a result, the processing circuitry 12 may not be able to decode or may decode with insufficient quality (e.g., signal-to-noise ratio) the downlink signal to obtain the data encoded in the broadcast interval 172, the broadcast (BCAST) section 174, and the unicast (UCAST) section 176. With this in mind, FIG. 7 illustrates a schematic diagram of the user equipment 10 of FIG. 1 using the antenna 55A (Ant 1) 188 being blocked by an obstruction 200 to receive a signal, according to embodiments of the present disclosure. The obstruction 200 may include any object that locate between the antenna 55A and the communication node 102. In some embodiments, a user may use one hand to grip the user equipment 10, thereby blocking the downlink signal transmitted to the antenna 55A. In some embodiments, the user may use the user equipment 10 in an obstructed location, such as a foliage-covered location, a room inside a building, and the like.

The obstruction 200 may cause the antenna 55A to receive a weakened or interfered downlink signal with decreased signal-to-noise ratio. The weakened or interfered downlink signal may include IQ samples 202 detected at the blocked antenna 55A (Ant 1). The processing circuitry 12 may analyze the IQ samples 202. In addition to the offset values caused by the movement of the communication node 102, the movement of the user equipment 10, or both, the IQ samples 202 may have larger time and frequency offset values (e.g., larger than the IQ samples 190 detected at the unblocked antenna 55A (Ant 1) of FIG. 5) because the weakened or interfered downlink signal may have increased noise or interference. The processing circuitry 12 may analyze the IQ samples 202 in the frequency domain to determine a frequency offset 204 (e.g., in C Hz that is larger than A Hz frequency offset of IQ samples 190) with respect to the central frequency (FO) 194. Additionally, the processing circuitry 12 may analyze the IQ samples 202 in the time domain to determine a time offset 206 (e.g., in D samples that is larger than B samples time offset of the IQ samples 190) with respect to the starting time (TO) 198.

Figure 8:
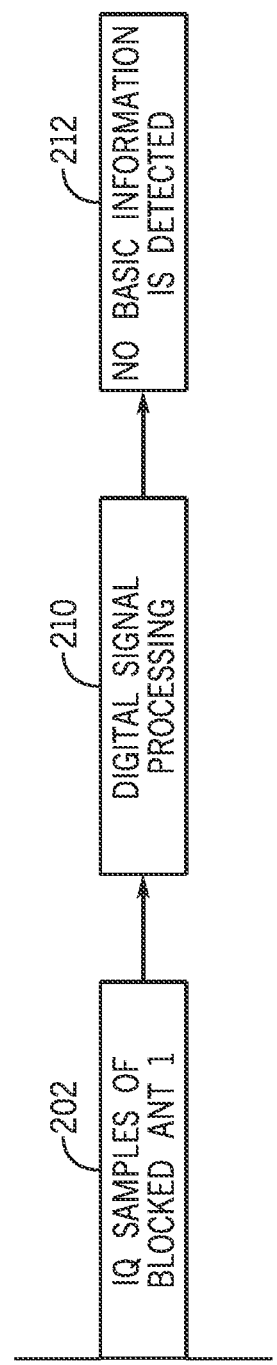
FIG. 8 is a block diagram of signal processing performed on the signal received by the blocked antenna of FIG. 7, according to embodiments of the present disclosure.

FIG. 8 is a block diagram of signal processing performed on the signal received by the blocked antenna 55A of FIG. 7, according to embodiments of the present disclosure. At a processing block 210 (e.g., similar to the processing block 192 of FIG. 6), the processing circuitry 12 may perform digital signal processing on the IQ samples 202. The digital signal processing may include signal analysis in both time and frequency domains. The processing circuitry 12 may determine the frequency offset 204 and the time offset 206 based on the signal analysis. Furthermore, the processing circuitry 12 may adjust the IQ samples 202 based on the determined frequency and time offsets to align the IQ samples 202 in both time and frequency domains.

After aligning the IQ samples 202, at a processing block 212, the processing circuitry 12 may decode the aligned IQ samples 202. However, due to an excessive amount of noise in the aligned IQ samples 202, the processing circuitry 12 may not decode the aligned IQ samples 202 to obtain data encoded in the broadcast interval 172, the broadcast (BCAST) section 174, and the unicast (UCAST) section 176. That is, even after adjusting the IQ samples 202 for the large time and frequency offsets, the signal processing at the processing block 212 may not detect any or detect very little signal energy, and hence decode little to no information, which may lead to a loss of synchronization to the communication node 102 or delayed data transmissions. That is, data may take longer time to be sent out or received on the user equipment 10, or a user may be unable to communicate to emergency services for an excessive period of time.

Figure 9:
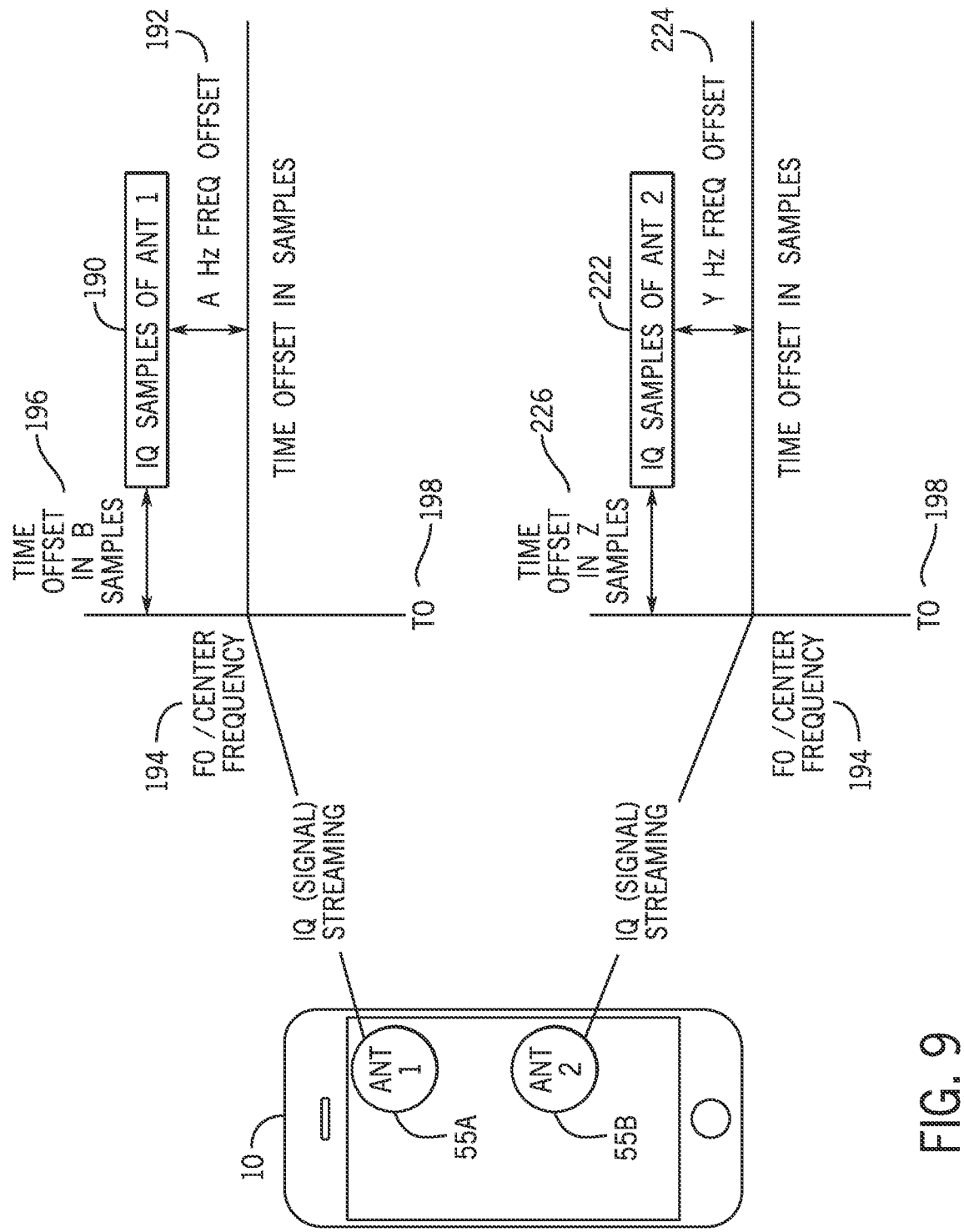
FIG. 9 is a schematic diagram of the user equipment of FIG. 1 using two antennas to receive signals, according to embodiments of the present disclosure.

To prevent the loss of synchronization to the communication node 102 or delayed data transmissions, the user equipment 10 may use two antennas 55 to receive the downlink signals and combine the received signals at the two antennas 55 to obtain a signal having better downlink performance (e.g., improved signal strength and/or signal-to-noise ratio) for an extended duration of time (e.g., including during emergency situations) in varying terrains and/or blocked positions (e.g., hand grip positions) when compared to using a single antenna (e.g., 55A) for detecting the downlink signals. FIG. 9 is a schematic diagram of the user equipment 10 of FIG. 1 using two antennas (e.g., antenna 55A (Ant 1) and antenna 55B (Ant 2)) to receive signals, according to embodiments of the present disclosure. The received signal at the antenna 55A (Ant 1) may include streamed data such as IQ samples 190. The processing circuitry 12 may analyze the IQ samples 190. The IQ samples 190 may be offset by frequency and time due to the movement of the communication node 102, the movement of the user equipment 10, or both. The processing circuitry 12 may analyze the IQ samples 190 in the frequency domain to determine the frequency offset 192 (e.g., in A Hz) with respect to the central frequency (FO) 194, and in the time domain to determine the time offset 196 (e.g., in B samples) with respect to the starting time (TO) 198. Similarly, the received signal at the antenna 55B (Ant 2) may include streamed data such as IQ samples 222. The processing circuitry 12 may analyze the IQ samples 222. The IQ samples 222 may be offset by frequency and time due to the movement of the communication node 102, the movement of the user equipment 10, or both. The processing circuitry 12 may analyze the IQ samples 222 in the frequency domain to determine a frequency offset 224 (e.g., in Y Hz) with respect to the central frequency (FO) 194, and in the time domain to determine a time offset 226 (e.g., in Z samples) with respect to the starting time (TO) 198. The frequency offset 224 and the time offset 226 of the IQ samples 222 may be different (e.g., smaller) from the frequency offset 192 and the time offset 194 of the IQ samples 202 due to orientation of the user equipment 10, the different positions of the antennas 55 on the user equipment 10, or both.

Figure 10:
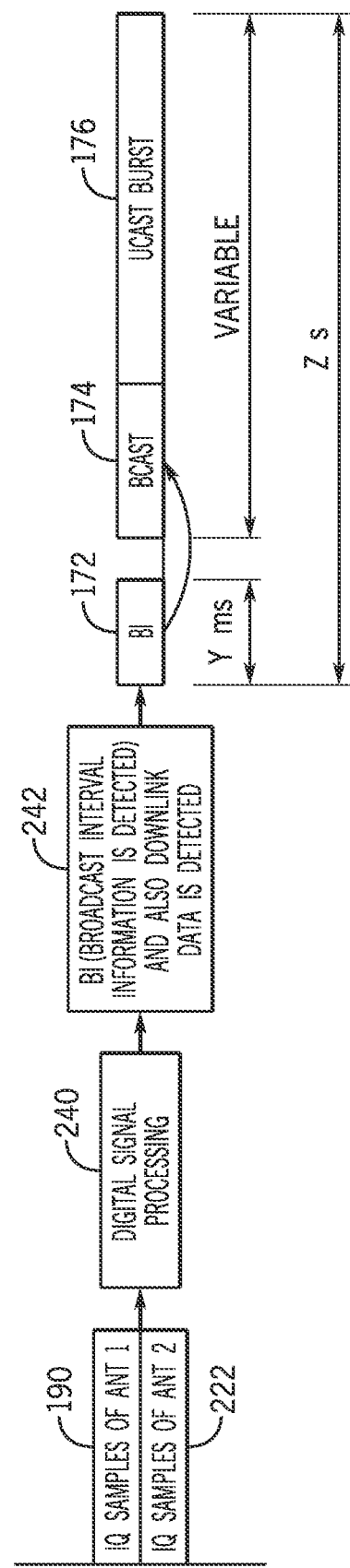
FIG. 10 is a block diagram of signal processing received on the signals received by the two antennas of FIG. 9, according to embodiments of the present disclosure.

FIG. 10 is a block diagram of signal processing performed on the signals received by the two antennas 55 of FIG. 9, according to embodiments of the present disclosure. At a processing block 240, the processing circuitry 12 may perform digital signal processing to the IQ samples 190 and IQ samples 222 separately and independently. The digital signal processing may include signal analysis in both time and frequency domains. For example, the user equipment 10 may determine the frequency offset 192 and the time offset 194 based on the signal analysis on the IQ samples 190. Furthermore, the processing circuitry 12 may adjust the IQ samples 190 based on the determined frequency and time offsets to align the IQ samples 190 in both time and frequency domains. In some embodiments, the processing circuitry may align the IQ samples 190 and the IQ samples 222 by only adjusting one of the IQ samples (e.g., 222) to align with the other, unadjusted IQ sample (e.g., 190). Additionally, the processing circuitry 12 may perform signal and noise analysis to estimate signal strength associated with the aligned IQ samples 190 based on detected pilot power (e.g., using an estimated signal-to-noise ratio) and other relevant information (e.g., historical signal records). In similar processing, the processing circuitry 12 may determine the frequency offset 224 and the time offset 226 based on the signal analysis on the IQ samples 222, adjust the IQ samples 222 based on the determined frequency and time offsets to align the IQ samples 222 in both time and frequency domains, and estimate signal strength associated with the aligned IQ samples 222 based on detected pilot power (e.g., using an estimated signal-to-noise ratio) and other relevant information.

After aligning the IQ samples 190 and 222, at a processing block 242, the processing circuitry 12 may combine the aligned IQ samples 190 and 222. For example, the processing circuitry 12 may determine a first weighting factor based on the pilot power associated with the aligned IQ samples 190 and apply the first weighting factor to the aligned IQ samples 190. Similarly, the processing circuitry may determine a second weighting factor based on the pilot power associated with the aligned IQ samples 222 and apply the second weighting factor to the aligned IQ samples 222. For example, the processing circuitry 12 may determine a ratio of the pilot power associated with the aligned IQ samples 190 to the pilot power associated with the aligned IQ samples 222, generate the first weighting factor corresponding to the pilot power associated with the aligned IQ samples 190 based on the ratio, and generate the second weighting factor corresponding to the pilot power associated with the aligned IQ samples 222 based on the ratio. As such, the greater the pilot power associated with the aligned IQ samples 190, the greater the first weighting factor, and the greater the pilot power associated with the aligned IQ samples 222, the greater the second weighting factor. The processing circuitry 12 may then combine the weighted IQ samples 190 and weighted IQ samples 222 to obtain a combined signal. The combined signal may have higher signal power and signal-to-noise ratio compared to using a single antenna (e.g. the antenna 55A or 55B) for receiving the downlink signals. As a result, the processing circuitry 12 may decode the combined signal to obtain data encoded in the broadcast interval 172, the broadcast (BCAST) section 174, and the unicast (UCAST) section 176 with improved reliability and accuracy compared to using a single antenna.

Figure 11:
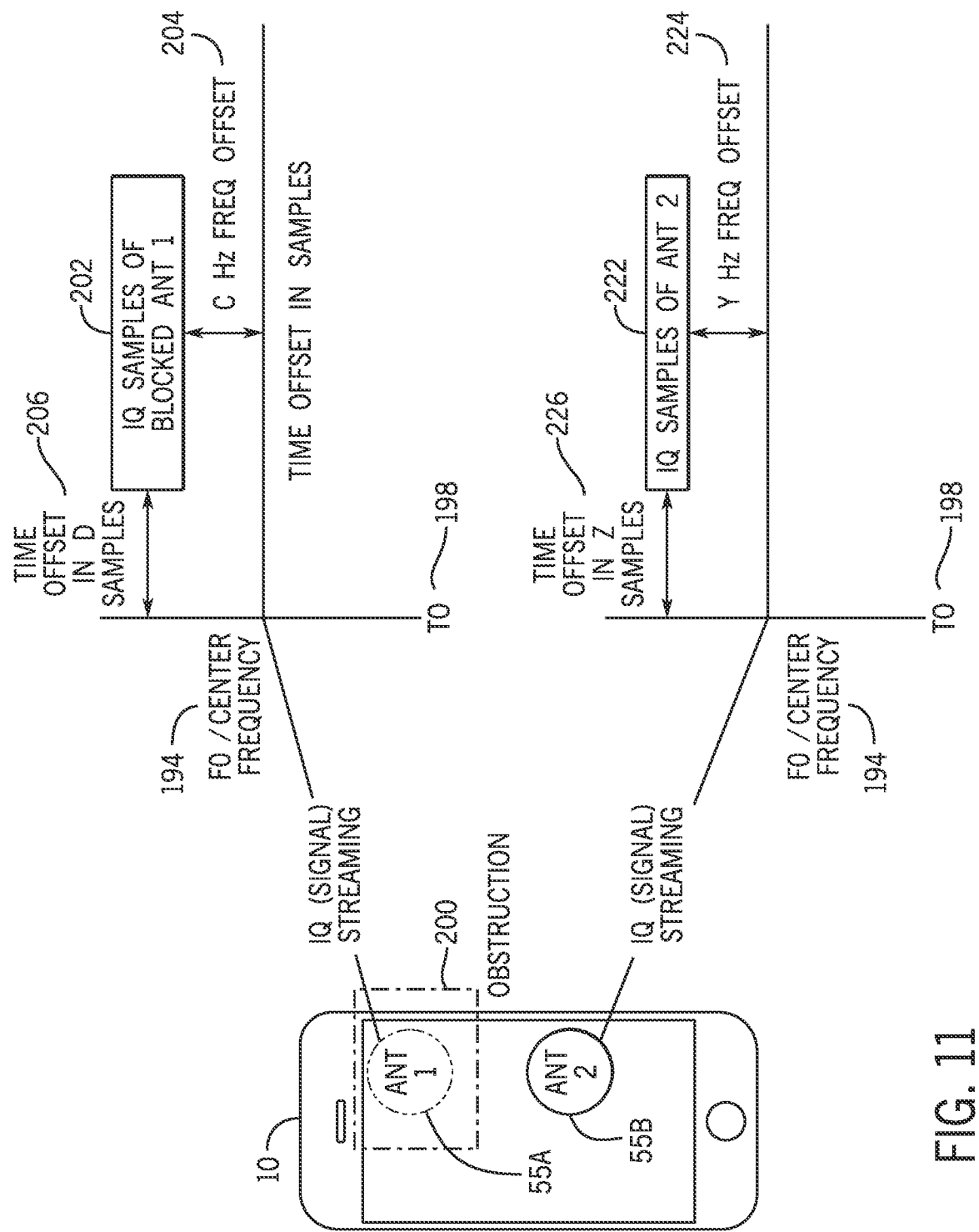
FIG. 11 is a schematic diagram of the user equipment of FIG. 1 using one blocked antenna and one unblocked antenna to receive signals, according to embodiments of the present disclosure.

FIG. 11 is a schematic diagram of the user equipment of FIG. 1 using one blocked antenna (e.g., antenna 55A) and one unblocked antenna (e.g., antenna 55B) to receive signals, according to embodiments of the present disclosure. The antenna 55A (Ant 1) is blocked by the obstruction 200. As described previously, the obstruction 200 may cause the antenna 55A to receive a weakened or interfered downlink signal with decreased signal-to-noise ratio. The weakened or interfered downlink signal may include the IQ samples 202 received at the blocked antenna 55A (Ant 1). The antenna 55B (Ant 2) is unblocked and receives the downlink signals with better or good signal quality (e.g., higher signal strength and signal-to-noise ratio). The received downlink signals may include the IQ samples 222. The processing circuitry 12 may analyze the IQ samples 202 in the frequency and time domains to determine the frequency offset 204 (e.g., in C Hz) with respect to the central frequency (FO) 194 and the time offset 206 (e.g., in D samples) with respect to the starting time (TO) 198. Separately and independently, the processing circuitry 12 may analyze the IQ samples 222 in the frequency and time domains to determine the frequency offset 224 (e.g., in Y Hz) with respect to the central frequency (FO) 194 and the time offset 226 (e.g., in Z samples) with respect to the starting time (TO) 198. The IQ samples 202 may have larger time and frequency offset values than the IQ samples 222 because the weakened or interfered downlink signal received by the antenna 55A may have more noise or interference.

Figure 12:
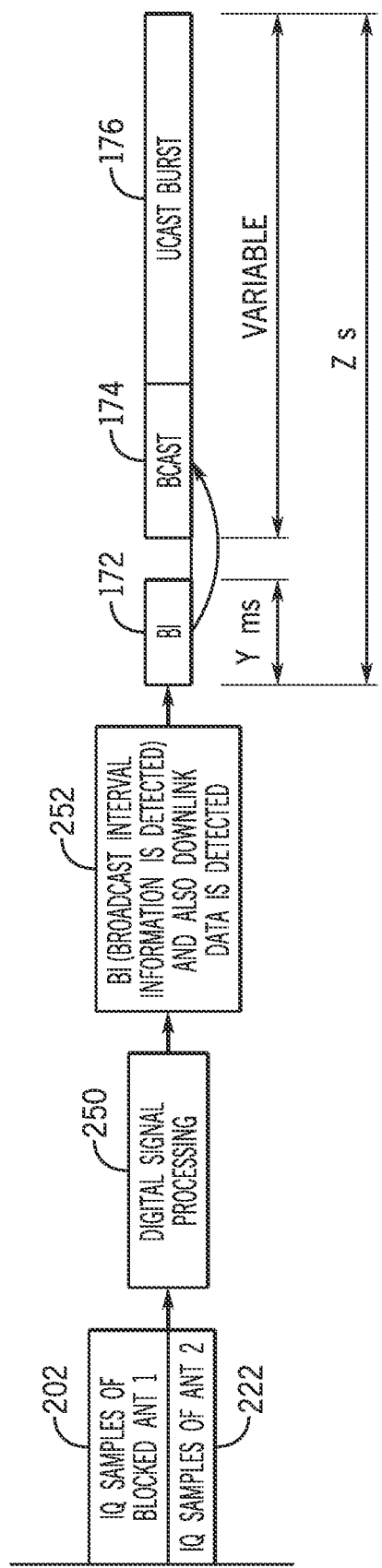
FIG. 12 is a block diagram of signal processing performed on the signals received by the blocked and unblocked antennas of FIG. 11, according to embodiments of the present disclosure.

FIG. 12 is a block diagram of signal processing performed on the signals received by the blocked and unblocked antennas (e.g., antennas 55A and 55B) of FIG. 11, according to embodiments of the present disclosure. When the antenna 55A (Ant 1) is blocked by the obstruction 200 (e.g., hand gripping the user equipment 10) or detects a weak signal (e.g., due to antenna position or orientation), the antenna 55B (Ant 2) may facilitate decoding downlink data when the antenna 55B receives downlink signals with good quality (e.g., the antenna 220 is not blocked by hand or is able to receive higher signal strength based on antenna position or orientation). At a processing block 250 (e.g., similar to the processing block 240 of FIG. 10), the processing circuitry 12 may perform digital signal processing to the IQ samples 202 and IQ samples 222 separately and independently. The digital signal processing may include signal analysis in both time and frequency domains. For example, the processing circuitry 12 may determine the frequency offset 204 and the time offset 206 based on the signal analysis on the IQ samples 202. Furthermore, the processing circuitry 12 may adjust the IQ samples 202 based on the determined frequency and time offsets to align the IQ samples 202 in both time and frequency domains. Additionally, the user equipment 10 may use the processing circuitry to perform signal and noise analysis to estimate signal strength associated with the aligned IQ samples 202 based on detected pilot power (e.g., using an estimated signal-to-noise ratio) and other relevant information (e.g., historical signal records). In similar processing, the user equipment 10 may determine the frequency offset 224 and the time offset 226 based on the signal analysis on the IQ samples 222, adjust the IQ samples 222 based on the determined frequency and time offsets to align the IQ samples 222 in both time and frequency domains, and estimate signal strength associated with the aligned IQ samples 222 based on detected pilot power (e.g., using an estimated signal-to-noise ratio) and other relevant information.

After aligning the IQ samples 202 and 222, at a processing block 252 (e.g., similar to the processing block 242 of FIG. 10), the processing circuitry 12 may combine the aligned IQ samples 202 and 222. For example, the processing circuitry 12 may determine a first weighting factor based on the pilot power associated with the aligned IQ samples 202 and apply the first weighting factor to the aligned IQ samples 202. Similarly, the processing circuitry 12 may determine a second weighting factor based on the pilot power associated with the aligned IQ samples 222 and apply the second weighting factor to the aligned IQ samples 222.

The processing circuitry 12 may then combine the weighted IQ samples 202 and weighted IQ samples 222 to obtain a combined signal. Because the antenna 55A is blocked by the obstruction 200, the pilot power of the downlink signal received at the blocked antenna 55A may be weaker or lower than the pilot power of the downlink signal received at the unblocked antenna 55B. As such, the first weighting factor associated with the aligned IQ samples 202 may be smaller than the second weighting factor associated with the aligned IQ samples 222. That is, the weaker signal received at the blocked antenna 55A may be given a smaller weighting factor than the stronger signal received at the unblocked antenna 55B. In this way, the combined signal may nevertheless have higher signal power and signal-to-noise ratio compared to using a single antenna (e.g. the antenna 55A) for detecting the downlink signals. As a result, the processing circuitry may decode the combined signal to obtain data encoded in the broadcast interval 172, the broadcast (BCAST) section 174, and the unicast (UCAST) section 176 with improved reliability and accuracy compared to using a single antenna.

Figure 13:
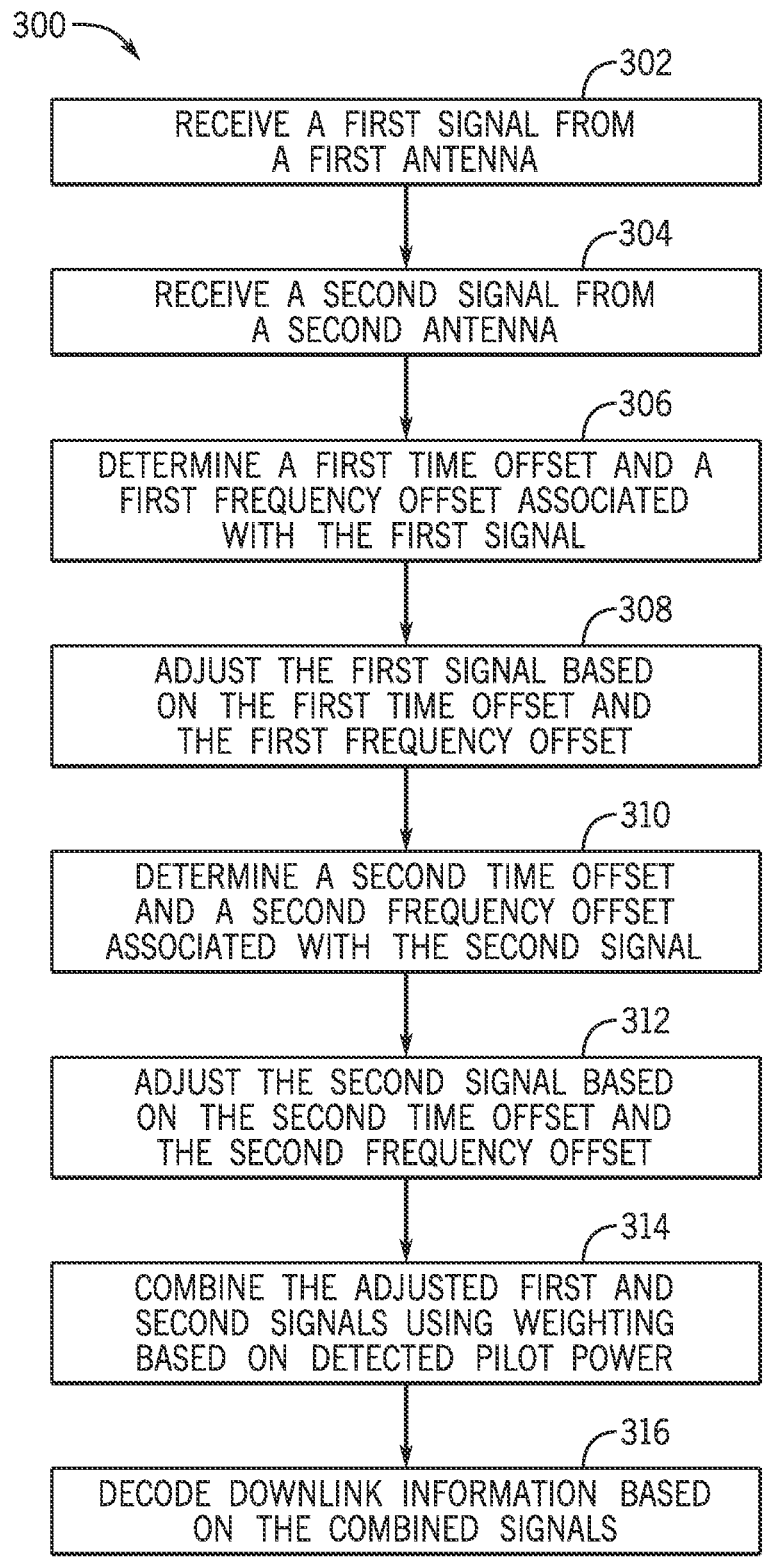
FIG. 13 is a flowchart of a method for communicating with the user equipment of FIG. 1 using combined signals received from two antennas, according to embodiments of the present disclosure.

With the preceding in mind, FIG. 13 is a flowchart of a method 300 for communicating with the user equipment 10 of FIG. 1 using combined signals received from two antennas (antennas 55A and 55B), according to embodiments of the present disclosure. Any suitable device (e.g., a controller) that may control components of the user equipment 10, such as the processing circuitry 12, may perform the method 300. In some embodiments, the method 300 may be implemented by executing instructions stored in a tangible, non-transitory, computer-readable medium, such as the memory 14 or storage 16, using the processing circuitry 12. For example, the method 300 may be performed at least in part by one or more software components, such as an operating system of the user equipment 10, one or more software applications of the user equipment 10, and the like. While the method 300 is described using steps in a specific sequence, it should be understood that the present disclosure contemplates that the described steps may be performed in different sequences than the sequence illustrated, and certain describe.

At block 302, the processing circuitry 12 receives a first signal from a first antenna (e.g., antenna 55A). At each communication cycle, the user equipment 10 may synchronize to a communication node (e.g., communication node 102) to establish a connection for bidirectional communication. The communication node 102 may transmit the first signal (e.g., a downlink signal) to the user equipment 10 via a forward beam (e.g., forward beam 154). The processing circuitry 12 may use a receiver (e.g., receiver 54) communicatively coupled to the first antenna to receive the first signal.

At block 304, the processing circuitry 12 receives a second signal from a second antenna (e.g., antenna 55B). The communication node 102 may transmit the second signal (e.g., the downlink signals) to the user equipment 10 via the forward beam 154. The processing circuitry 12 may use the receiver 54 communicatively coupled to the second antenna to receive the second signal.

Each of the first signal and the second signal may include multiple signal samples (e.g., IQ samples), each having a preamble, a broadcast interval (BI), a broadcast (BCAST) section, a unicast (UCAST) section, and so on. The IQ samples in the first signal and the second signal may be offset by frequency and time due to the movement of the communication node 102, the movement of the user equipment 10, or both. In some cases, the frequency and time offset values may become even larger than the values caused by the movement of the communication node and/or the movement of the user equipment 10. For example, when the first antenna is blocked by an obstruction (e.g., obstruction 200) or is detecting weak signal (e.g., due to antenna position or orientation), the IQ samples (e.g., IQ samples 202) received at the first antenna may have larger time and frequency offset values because the first signal may have more noise or interference in comparison to the IQ samples (e.g., IQ samples 222) received at the second antenna that is unblocked or in a better position or orientation.

At block 306, the processing circuitry 12 determines a first time offset and a first frequency offset associated with the first signal. For example, the processing circuitry 12 may perform digital signal processing on the IQ samples 202. The digital signal processing may include signal analysis in both time and frequency domains. For example, the processing circuitry 12 may analyze (e.g., using Fourier transform or fast Fourier transform (FFT)) the IQ samples 202 in the frequency domain to determine the frequency offset (e.g., the frequency offset 204 in C Hertz (hz)) with respect to the central frequency (FO) 194. The processing circuitry 12 may analyze the IQ samples 202 in the time domain to determine the time offset (e.g., the time offset 206 in D samples) with respect to the starting time (TO) 198. Furthermore, the processing circuitry 12 may store the frequency offset 204 and the time offset 206 the memory 14 or storage 16.

At block 308, the processing circuitry 12 adjusts the first signal based on the first time offset 206 and the first frequency offset 204. For example, the processing circuitry 12 may adjust the IQ samples 202 of the first signal based on the time offset 206 by shifting the IQ samples 202 toward the starting time (TO) 198 in the time domain. Additionally, the processing circuitry 12 may adjust (e.g., align) the IQ samples 202 of the first signal based on the frequency offset 204 by shifting the IQ samples 202 toward the central frequency (FO) 194 in the time domain.

Furthermore, after aligning the IQ samples 202 of the first signal in both the time and frequency domains, the processing circuitry 12 may perform further signal processing operations based on the aligned IQ samples 202. Such signal processing operations may include signal-to-noise ratio (SNR) estimation, filtering, denoise, and so on. For instance, the processing circuitry 12 may perform a signal/noise analysis (in time or frequency domain) to estimate a first signal-to-noise ratio (SNR1) using the aligned signal IQ samples 202. Based on the estimated first signal-to-noise ratio (SNR1), the processing circuitry 12 may determine signal strength (e.g., a first pilot power) associated with the first signal. In one embodiment, the processing circuitry 12 may receive a measured power (e.g., a total power) associated with the first signal that the first pilot power and a first noise power. The processing circuitry 12 may determine the first signal power based on the measured total power and the first signal-to-noise ratio (SNR1 denoted as a ratio of the first pilot power to the first noise power), for example, using the measured total power multiplied by SNR1/(1+SNR1)).

At block 310, the processing circuitry 12 determines a second time offset and a second frequency offset associated with the second signal. For example, the processing circuitry 12 may perform digital signal processing on the IQ samples 222. The digital signal processing may include signal analysis in both time and frequency domains. For example, the processing circuitry 12 may analyze (e.g., using Fourier transform or fast Fourier transform (FFT)) the IQ samples 222 in the frequency domain to determine the frequency offset (e.g., the frequency offset 224 in Y Hertz (hz)) with respect to the central frequency (FO) 194. The processing circuitry 12 may also analyze the IQ samples 222 in the time domain to determine the time offset (e.g., the time offset 226 in Z samples) with respect to the starting time (TO) 198. Furthermore, the processing circuitry 12 may store the frequency offset 224 and the time offset 226 the memory 14 or storage 16.

At block 312, the user equipment 10 adjusts the second signal based on the second time offset and the second frequency offset. For example, the processing circuitry 12 may adjust the IQ samples 222 of the second signal based on the time offset 226 by shifting the IQ samples 222 toward the starting time (TO) 198 in the time domain. Additionally, the processing circuitry 12 may adjust (e.g., align) the IQ samples 222 of the second signal based on the frequency offset 224 by shifting the IQ samples 222 toward the central frequency (FO) 194 in the time domain.

Furthermore, after aligning the IQ samples 222 of the second signal in both the time and frequency domains, the processing circuitry 12 may perform further signal processing operations based on the aligned IQ samples 222. Such signal processing operations may include signal-to-noise ratio (SNR) estimation, filtering, de-noise, and so on. For instance, the processing circuitry 12 may perform a signal/noise analysis (in time or frequency domain) to estimate a second signal-to-noise ratio (SNR2) using the aligned signal IQ samples 222. Based on the estimated signal-to-noise ratio, the processing circuitry 12 may determine signal strength (e.g., a second pilot power) associated with the second signal. In one embodiment, the processing circuitry 12 may receive a measured power (e.g., a total power) associated with the second signal that includes signal power and noise power. The processing circuitry 12 may determine the signal power based on the measured total power and the SNR2 (SNR2 denoted as a ratio of the second pilot power to the second noise power), for example, using the measured total power multiplied by SNR2/(1+SNR2)).

In some cases, the first antenna 55A may be blocked by the obstruction 200 or in a position or orientation that may cause a weakened or interfered downlink. As a result, the first pilot power of the downlink signal received at the first antenna 55A may be weaker or lower than the second pilot power of the downlink signal received at the second antenna 55B that is unblocked or in a better position or orientation. Moreover, the first signal received at the first antenna 55A may have lower signal-to-noise ratio than the second signal received at the second antenna 55B.

At block 314, the processing circuitry 12 combines the adjusted first and second signals using weighting based on detected pilot power. For example, the processing circuitry 12 may determine a power ratio of the first pilot power associated with the aligned IQ samples 202 to the second pilot power associated with the aligned IQ samples 222. The processing circuitry 12 may then determine the first weighting factor corresponding to the first pilot power associated with the aligned IQ samples 202 based on the ratio, and the second weighting factor corresponding to the second pilot power associated with the aligned IQ samples 222 based on the ratio. That is, the greater the first pilot power associated with the aligned IQ samples 202, the greater the first weighting factor, and the greater the second pilot power associated with the aligned IQ samples 222, the greater the second weighting factor. In this way, the weaker signal received at the blocked antenna 55A may be given a smaller weighting factor than the stronger signal received at the unblocked antenna 55B, thus the combined signal may nevertheless have higher signal power and signal-to-noise ratio compared to using a single antenna (e.g. the antenna 55A or 55B) for receiving the downlink signal.

After combining the adjusted first and second signals using the first and second weighting factors, at block 316, the processing circuitry 12 decodes downlink information based on the combined signals. The combined signal may have higher signal power and signal-to-noise ratio compared to using a single antenna (e.g. the antenna 55A or 55B) for receiving the downlink signals. Using the combined signals, the processing circuitry 12 may decode the combined signal to obtain data encoded in the broadcast interval 172, the broadcast (BCAST) section 174, and the unicast (UCAST) section 176 with improved reliability and accuracy compared to using a single antenna (e.g. the antenna 55A or 55B) for receiving the downlink signal and decoding the downlink signal. In this manner, the method 300 enables communicating with the user equipment 10 using combined signals received from two antennas (e.g., antennas 55A and 55B).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. User equipment comprising:
a first antenna and a second antenna;
a receiver coupled to the first antenna and the second antenna; and
processing circuitry coupled to the receiver, the processing circuitry configured to
cause the receiver to receive a first signal via the first antenna,
cause the receiver to receive a second signal via the second antenna, each of the first signal and the second signal comprising an in-phase sample and a quadrature sample, the in-phase sample and the quadrature sample each comprising a preamble, a broadcast interval, a broadcast section, and a unicast section,
adjust the first signal based on a first time offset and a first frequency offset associated with the first signal to generate a first adjusted signal, adjust the second signal based on a second time offset and a second frequency offset associated with the second signal to generate a second adjusted signal, combine the first adjusted signal and the second adjusted signal to generate a combined signal, and decode downlink information based on the combined signal.

2. The user equipment of claim 1, wherein the first signal and the second signal are different in signal strength based on different locations and orientations of the first antenna and the second antenna.

3. The user equipment of claim 1, wherein the first signal and the second signal correspond to a downlink signal transmitted from a communication node, wherein the user equipment is synchronized to the communication node to establish bidirectional communication.

4. The user equipment of claim 3, wherein the communication node is configured to relay an uplink signal from the user equipment to a communication hub and relay the downlink signal based on the uplink signal from the communication hub to the user equipment.

5. The user equipment of claim 3, wherein the processing circuitry is configured to determine the first time offset and the first frequency offset associated with the first signal, and the second time offset and the second frequency offset associated with the second signal, based on positioning data associated with the user equipment and the communication node.

6. The user equipment of claim 1, wherein the downlink information is encoded in the broadcast interval, the broadcast section, and the unicast section.

7. The user equipment of claim 1, comprising a global navigation satellite system (GNSS) receiver configured to receive GNSS signals from a GNSS network and process the GNSS signals to determine a global position of the user equipment.

8. The user equipment of claim 1, wherein the first time offset associated with the first signal and the second time offset associated with the second signal are different based on a movement of a communication node, a movement of the user equipment, or both, and wherein the first frequency offset associated with the first signal and the second frequency offset associated with the second signal are different based on the movement of the communication node, the movement of the user equipment, or both.

9. The user equipment of claim 1, wherein the processing circuitry is configured to determine the first time offset and the first frequency offset based on a first signal analysis in both time and frequency domains using a starting time and a central frequency, and determine the second time offset and the second frequency offset based on a second signal analysis in both the time and frequency domains using the starting time and the central frequency.

10. The user equipment of claim 9, wherein the processing circuitry is configured to adjust the first signal by shifting the first signal based on the starting time and the first time offset in the time domain, and shifting the first signal based on the central frequency and the first frequency offset in the frequency domain.

11. The user equipment of claim 9, wherein the processing circuitry is configured to adjust the second signal by shifting the second signal based on the starting time and the second time offset in the time domain, and shifting the second signal based on the central frequency and the second frequency offset in the frequency domain.

12. The user equipment of claim 1, wherein adjusting the first signal comprises applying a first weighting factor to the first signal, and adjusting the second signal comprises applying a second weighting factor to the second signal.

13. The user equipment of claim 12, wherein the processing circuitry is configured to determine a first pilot power based on a first signal-to-noise ratio associated with the first signal, determine a second pilot power based on a second signal-to-noise ratio associated with the second signal, determine a power ratio between the first pilot power and the second pilot power, determine the first weighting factor based on the first pilot power and the power ratio, and determine the second weighting factor based on the second pilot power and the power ratio.

14. A method comprising:

receiving a first signal via a receiver coupled to a first antenna of an electronic device;

receiving a second signal via the receiver coupled to a second antenna of the electronic device;

determining, via processing circuitry of the electronic device, a first weighting factor associated with the first signal based on a first pilot power of the first signal;

determining, via the processing circuitry of the electronic device, a second weighting factor associated with the second signal based on a second pilot power of the second signal;

adjusting, via the processing circuitry of the electronic device, the first signal based on a first time offset, a first frequency offset, and the first weighting factor associated with the first signal to generate a first adjusted signal;

adjusting, via the processing circuitry of the electronic device, the second signal based on a second time offset, a second frequency offset, and the second weighting factor associated with the second signal to generate a second adjusted signal;

combining, via the processing circuitry of the electronic device, the first adjusted signal and the second adjusted signal to generate a combined signal; and decoding, via the processing circuitry of the electronic device, downlink information based on the combined signal.

15. The method of claim 14, comprising determining, via the processing circuitry of the electronic device, the first pilot power based on a first signal-to-noise ratio associated with the first signal, and determining, via the processing circuitry of the electronic device, the second pilot power based on a second signal-to-noise ratio associated with the second signal.

16. The method of claim 14, wherein the first time offset, the first frequency offset, and the first pilot power associated with the first signal received at the first antenna are different from the second time offset, the second frequency offset, and the second pilot power associated with the second signal received at the second antenna, respectively.

17. A non-transitory, computer-readable medium comprising instructions that, when executed by processing circuitry of user equipment, cause the processing circuitry to:

receive a first signal via a first antenna of an electronic device;

receive a second signal via a second antenna of the electronic device;

determine a first time offset and a first frequency offset associated with the first signal based on a first signal analysis in both time and frequency domains using a starting time and a central frequency;

determine a second time offset and a second frequency offset associated with the second signal based on a second signal analysis in both the time and frequency domains using the starting time and the central frequency;

adjust the first signal based on the first time offset and the first frequency offset to generate a first adjusted signal;

adjust the second signal based on the second time offset and the second frequency offset to generate a second adjusted signal;

combine the first adjusted signal and the second adjusted signal to generate a combined signal; and decode downlink information based on the combined signal.

18. The non-transitory, computer-readable medium of claim 17, wherein the combined signal has increased signal strength and signal-to-noise ratio compared to each of that of the first signal and the second signal.

19. The non-transitory, computer-readable medium of claim 17, wherein each of the first signal and the second signal comprise an in-phase sample and a quadrature sample, the in-phase sample and the quadrature sample each comprising a preamble, a broadcast interval, a broadcast section, and a unicast section.

20. The non-transitory, computer-readable medium of claim 17, wherein the instructions, when executed by processing circuitry of user equipment, cause the processing circuitry to:

determine a first weighting factor associated with the first signal based on a first pilot power of the first signal;

determine a second weighting factor associated with the second signal based on a second pilot power of the second signal;

adjust the first signal based on the first weighting factor, the first time offset, and the first frequency offset to generate the first adjusted signal; and adjust the second signal based on the second weighting factor, the second time offset, and the second frequency offset to generate the second adjusted signal.

* * * * *